Sept. 7, 1937.  A. A. SCARLETT  2,092,589
TRACTOR PLANTER
Filed Feb. 14, 1934  5 Sheets-Sheet 4
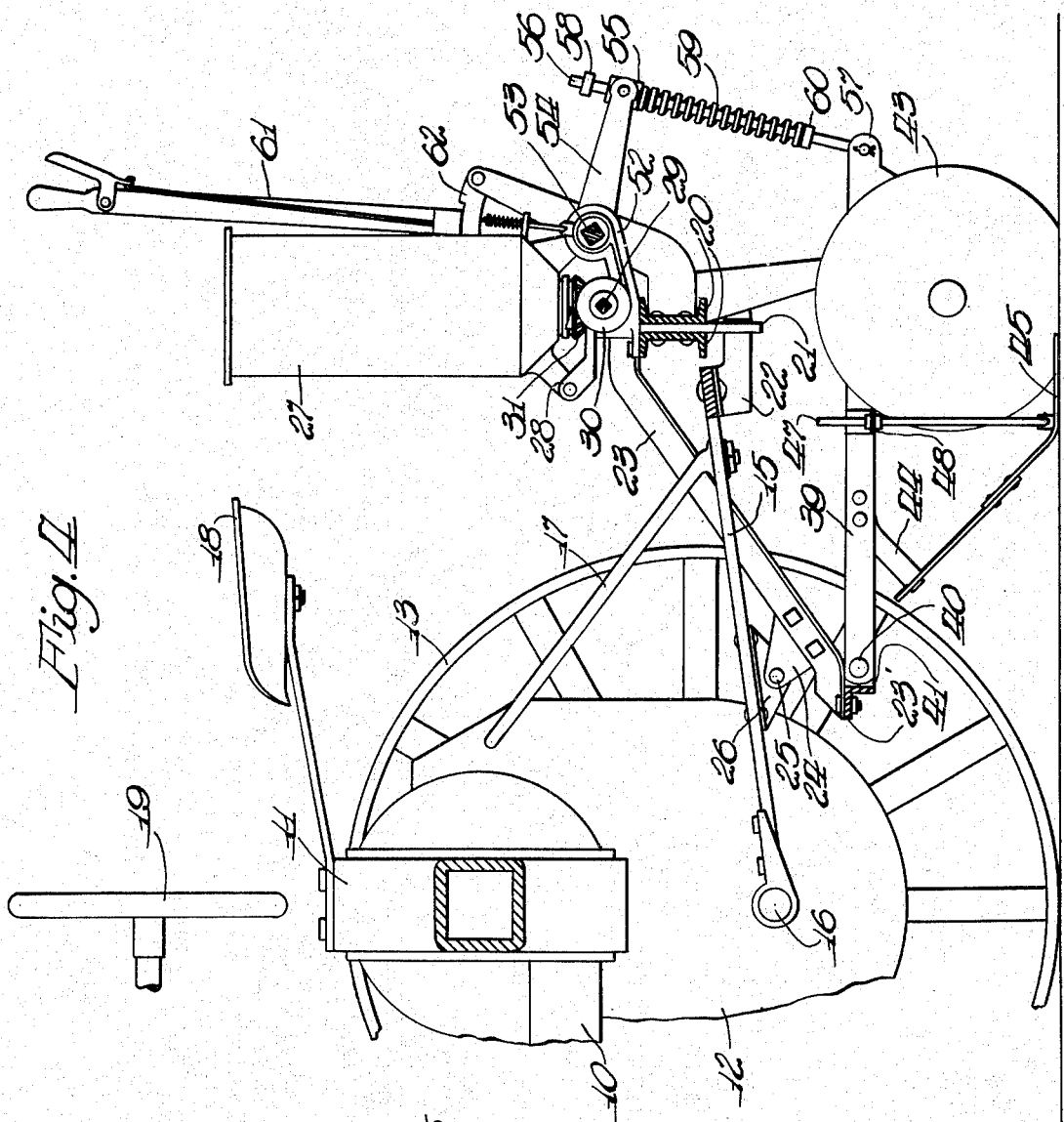
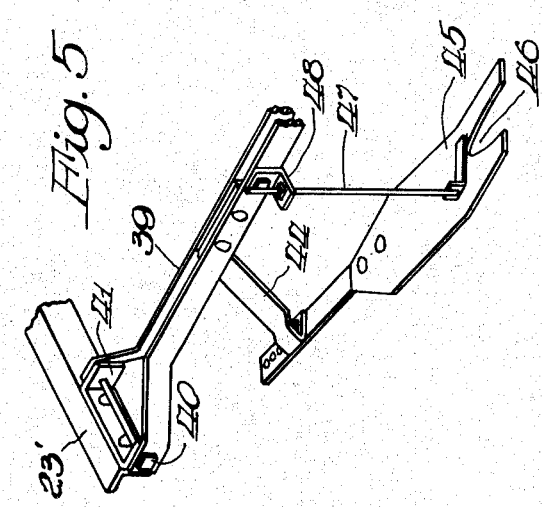
Inventor
Arthur A. Scarlett
By V. J. Gallagne
Atty.

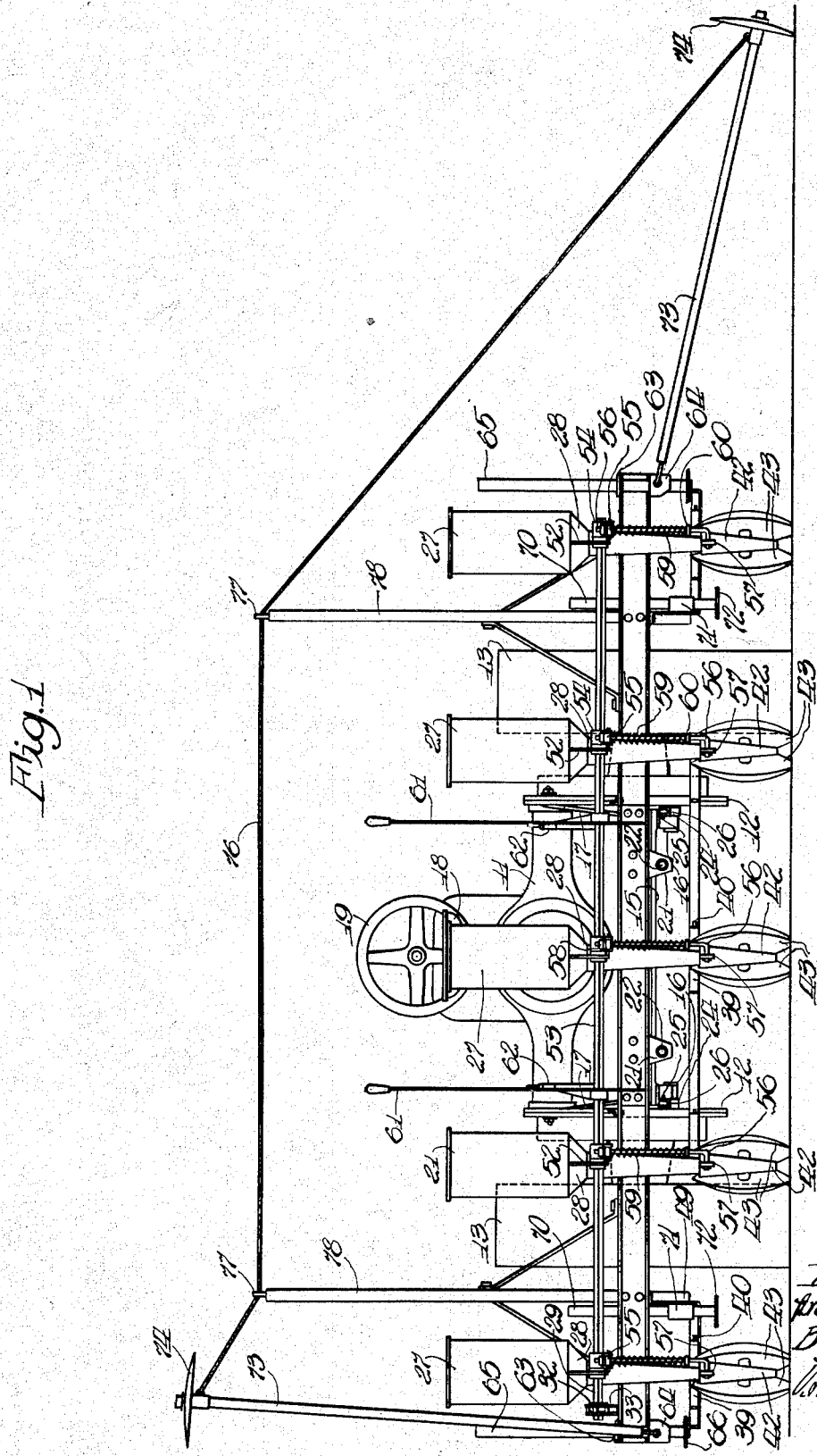

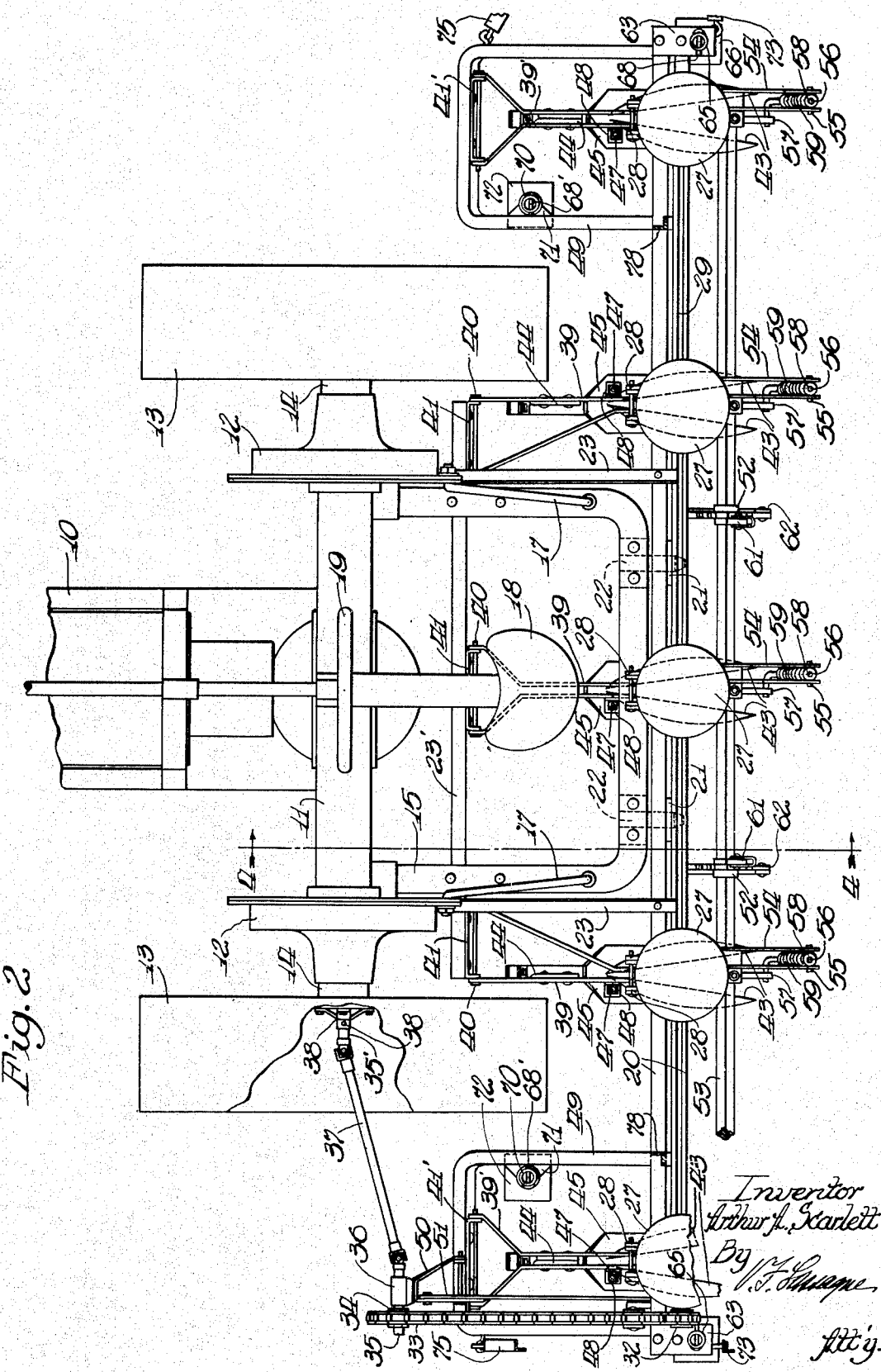

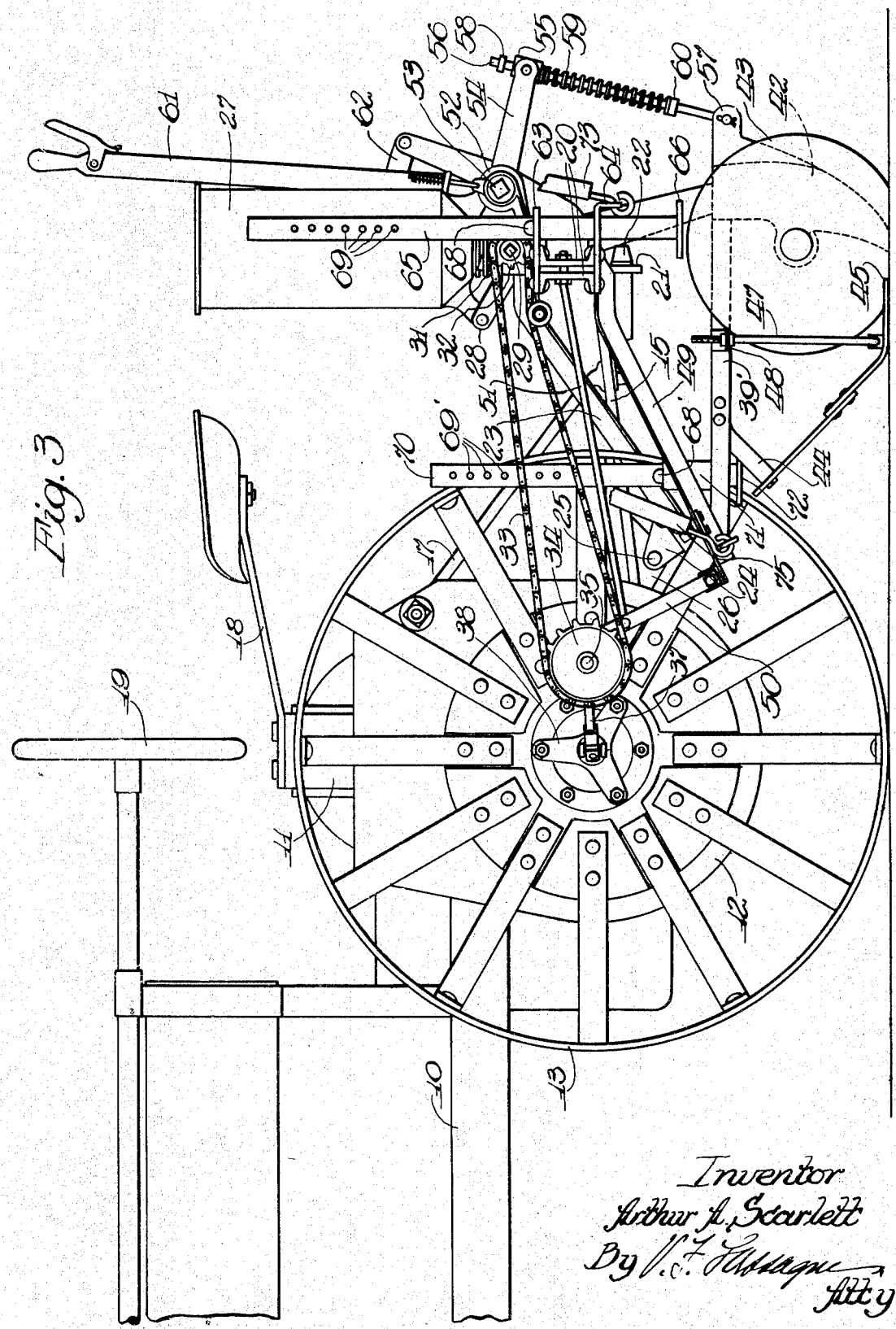

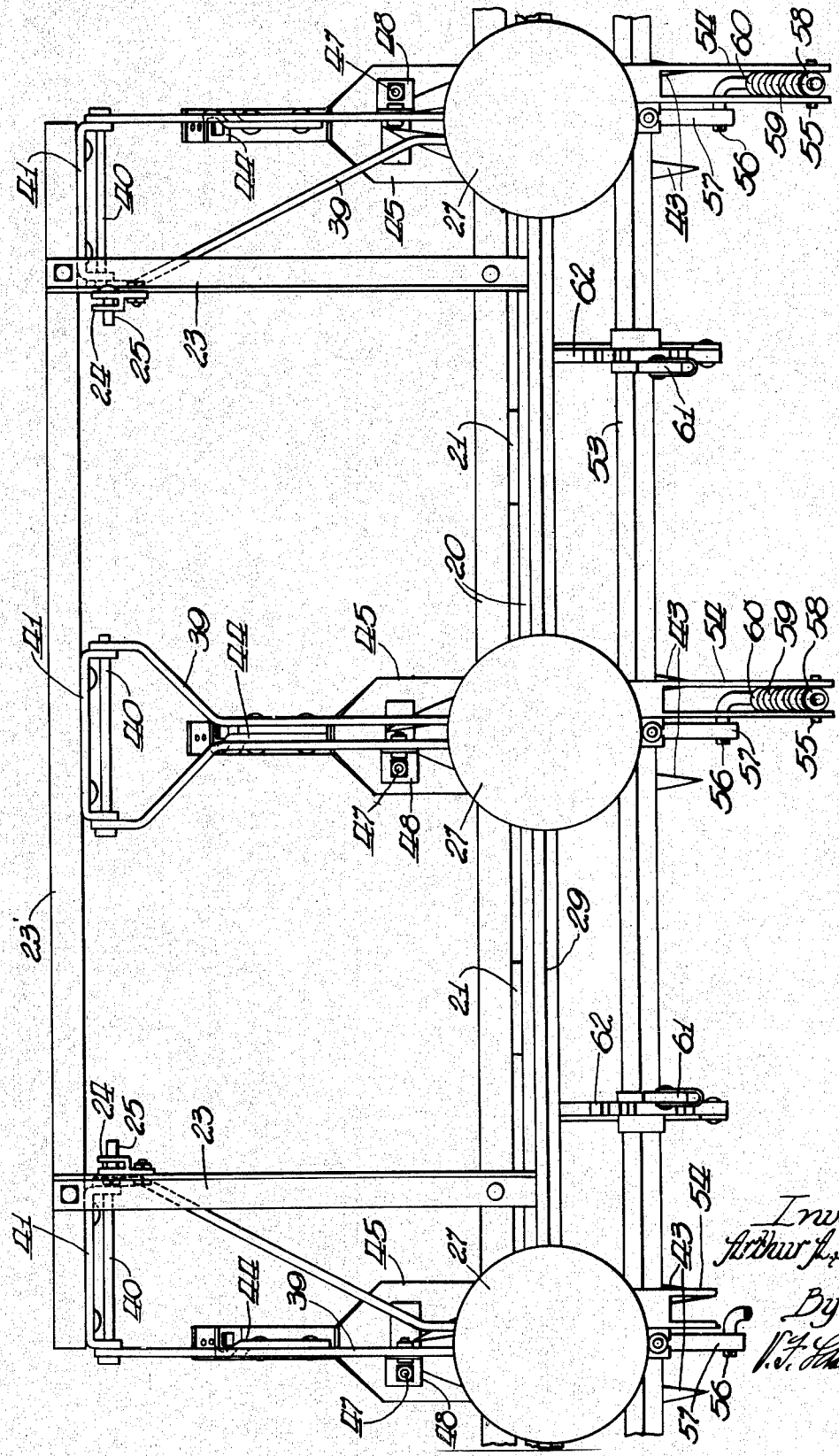

Patented Sept. 7, 1937

2,092,589

UNITED STATES PATENT OFFICE 2,092,589

TRACTOR PLANTER

Arthur A. Scarlett, Hamilton, Ontario, Canada, assignor, by mesne assignments, to International Harvester Company, Chicago, Ill., a corporation of New Jersey Application February 14, 1934, Serial No. 711,214

16 Claims. (Cl. 111—59)

This invention relates to a field implement. More specifically, it relates to a planter designed to be directly connected to a tractor and operated thereby.

In positioning directly connected implements on tractors, in many instances the implements have been forwardly connected at some location ahead of the traction wheels. In more recent developments it has been found desirable for many types of implements to attach them in so-called close coupled position with the soil engaging elements of the implement closely spaced behind the contact line of the traction wheels. Such constructions require that clearance space be provided for the traction wheels, particularly when the implement extends laterally beyond the traction wheels.

The principal object of the present invention is to construct an implement frame structure particularly adapted for being attached to a tractor at the rear thereof in a close coupled position. Another object is to provide a multiple row-crop implement, some units of which are between the traction wheels and others of which are positioned laterally beyond the traction wheels. Another object is the provision of a simplified driving mechanism. Another object of a somewhat different nature is the provision of supporting means which may be utilized to support the implement in proper position for attachment on the tractor after disconnecting it, whereby it remains in position to be readily attached.

The above mentioned objects and others which will be apparent from the detailed description to follow are attained by a construction such as illustrated in the drawings, in which:

Figure 1 is a rear view of a conventional wide tread tractor and a five-row planter attached thereto embodying the principles of the invention;

Figure 2 is a top plan view of the tractor and planter shown in Figure 1, only the rear end of the tractor being shown;

Figure 3 is a side elevation of the same structures shown in Figure 2;

Figure 4 is a vertical, longitudinal section taken on the line 4—4 of Figure 2;

Figure 5 is a perspective view of the furrow opener gauging means showing a portion of the furrow opener supporting means; and, Figure 6 is an enlarged plan view of the center section of the planter detached from the tractor.

The tractor shown in the drawings is of a conventional wide tread type having a narrow body portion 10, an arched rear axle 11 containing the driving mechanism, depending housings 12 at the ends of the axle structure, and traction wheels 13 mounted on driving axles 14 extending from the depending housings. A U-shaped drawbar 15 attached to trunnions 16 mounted on the lower portions of the depending housings 12 at the inner sides thereof extends rearwardly of the tractor a substantial distance beyond a vertical transverse plane tangent to the peripheries of the traction wheels. Brace rods 17 connected to the side portions of the drawbar and to the housings 12 hold the drawbar rigidly in position. An operator's seat 18 has been illustrated, and a steering wheel 19 for guiding the tractor.

The implement illustrated as being directly attached to the tractor in close coupled relation is a five-row planter. Said planter consists basicly of a main frame structure rigidly secured to the tractor drawbar and furrow opening units pivotally and adjustably secured to the main frame structure. Two transversely extending channel bars 20 spaced apart with the open sides of the channels directed outwardly are rigidly secured together in spaced relation. As illustrated in Figure 4, the two bars are riveted together against members 21. There are also other members secured between the bars and to the upper and lower flanges thereof, as will be hereinafter described.

The members 21 extend downwardly below the bars 20 and are formed with openings therethrough, which slidably fit over shaft-like portions of members 22 forming quick detachable means, rigidly secured in transversely spaced position to the drawbar 15. The ends of the shaft-like portions are tapered for readily inserting them in the members 21 during attaching of the implement to the tractor. In this manner, the implement may be quickly attached and detached from the tractor.

A pair of angle bars 23 secured to the upper flanges of the bars 20 extend downwardly, as shown in both Figures 3 and 4, outside the side portions of the drawbar 15. Brackets 24 secured to the lower ends of said angle bars are secured on a transverse axis by removable pins 25 to downwardly extending brackets 26 secured to the side portions of the drawbar. Draft for the planter is transmitted through the brackets 24 and 26. It will be understood that the members 22 engage the frame structure of the planter as formed by the channel bars 20 and the angle bars 23, preventing substantially all movement of said frame structure with respect to the drawbar, except movement in a longitudinal direction. The connection of the front end of the bars 23 with the drawbar prevents movement in a longitudinal direction, whereby the planter frame structure is secured against movement relative to the drawbar, and subsequently the tractor.

Conventional seeding mechanisms are mounted on the planter frame structure. Seed hoppers 27 are pivotally mounted on base members 28 secured to the bars 20. Said members also form supports for an operating shaft 29. Gears 30 on the shaft 29 engage gears 31 rotatably mounted on the base members 28 on vertical axes beneath the seed hoppers 27 for operating the seed dispensing mechanisms. The particular construction of the seed dispensing mechanisms has not been illustrated, as it may be of any of the conventional constructions well known to those skilled in the art.

Adjacent one end of the shaft 29, a chain sprocket 32 provides means for driving the seeding mechanisms from a chain 33. Said chain engages a sprocket 34 mounted on a shaft 35 carried in a bearing bracket 36. The shaft 35 is connected by a pair of universal joints and a shaft 37 with a stub shaft 35'. As shown in the broken-away portion of the wheel in Figure 2, the stub shaft 35' is slidably fitted in a member 38, being secured thereto by a pin 38'. The member 38 is secured to the traction wheel by some of the hub bolts used to secure the wheel in position. By this means, driving means operable from the tractor are provided for operating the seeding mechanisms.

At the forward ends of the angle bars 23, a transversely extending angle bar 23' is connected to form means for attaching the three center beams 39 on which the soil engaging elements are mounted. The beams 39, as best shown in Figure 6, each consists of two spaced bars pivotally connected by pins 40 to brackets 41 secured to the angle bar 23'. The rear ends of said bars are brought together to form an attaching beam for a substantially vertical, hollow shank 42, through which the seed is delivered. A pair of disks 43 are mounted on said shank at opposite sides thereof to form furrow openers for the seed being planted. This furrow opener construction has not been shown in detail, as it may be of any conventional construction and does not form in itself a part of the present invention.

Forwardly of the furrow opening means, a forwardly and downwardly extending bracket 44, rigidly secured to each beam 39, forms means for adjustably attaching a gauge shoe 45. The rear end of the shoe, which is flat for engaging the ground, is provided with a V-shaped opening 46, in which the forward edges of the furrow opening disks 43 operate. A vertical link 47 extending from the rear end of the shoe up to a bracket 48 mounted on the beam 39 forms a means for adjusting the rear end of the shoe by adjusting nuts on opposite sides of the bracket 48. The forward end of the shoe 45 is provided with a plurality of spaced openings by which the shoe may be adjusted in a fore and aft direction on the bracket 44.

As above described the three center furrow opening units are pivotally connected on a transverse axis forwardly of a vertical, transverse plane tangent to the peripheries of the traction wheels and between said wheels. To attach the end units making up the five-row device, it is necessary to provide special frame extensions, as will now be described.

At each end of the channel bars 20, which extend laterally beyond the wheels a substantial distance, a U-shaped auxiliary frame 49 is rigidly secured. Said auxiliary frames extend forwardly beyond a vertical, transverse plane tangent to the peripheries of the traction wheels and are angled downwardly to a proper location for pivotally attaching the outer beams 39' of the outer furrow opening units. As best illustrated in Figure 2, the beams 39', which consist of two spaced bars similar to the beams 39, are pivotally attached on the same transverse axis as the beams 39 by brackets 41' secured to the auxiliary frames 49. The elements connected to and associated with the beams 39' are exactly the same as the beams 39 and bear corresponding numerals.

The bearing bracket 36 previously referred to, which supports the driving means for the seeding mechanisms, is attached to a bracket 50 rigidly secured to the forward side of the left auxiliary frame 49. As best shown in Figure 3, a brace rod 51 connects the bracket 50 with the channel bars 20. It is to be understood that any other desired bracing means for the auxiliary frames may be used, if found necessary.

Rearwardly extending brackets 52, mounted on the channel bars 20, support a transversely extending rockshaft 53. Rearwardly extending lever arms 54 rigidly connected to the rockshaft 53 are pivotally connected to the trunnions of blocks 55, through which lifting rods 56 slidably extend. Said rods are pivotally connected to rearward extensions 57 of the shanks 42. A stop 58 at the upper end of the rod provides means whereby the soil engaging units may be lifted by rotating the rockshaft 53. Compression springs 59 abutting the lower sides of the blocks 55 and against adjustable stops 60 provide means for resiliently urging the soil engaging units into operative position. A substantially vertically extending hand lever 61, rigidly connected to the rockshaft 53 and engageable with a notched sector 62, provides means for adjusting the rockshaft 53.

Adjacent each end of the channel bars 20, as shown in Figures 2 and 3, a horizontal and rearwardly extending plate 63 above said bars and a similar plate 64 below the bars are formed with vertically aligned openings, through which a standard 65 extends. Said standard is provided with a flat foot plate 66 at its bottom end. A lower opening is provided, through which a pin 68 is insertable for holding the standard in raised position when the implement is attached for use. A plurality of vertically spaced openings 69 are provided at the upper end of the standard, through which the pin 68 may be inserted below either the plate 63 or the plate 64, to support the implement when it is to be detached from the tractor.

At each end of the implement frame, spaced forwardly from the rear side as formed by the bars 20, a second standard 70 is provided. Said standard is vertically slidable through a sleeve 71 which is rigidly secured by suitable means to the side of the auxiliary frame 49. Said standard has a foot portion 72 and is provided with a lower opening for insertion of a pin 68', and openings 69' similarly located and for the same purpose as the openings identified by the same numbers in the standard 65.

A marker bar 73 is pivoted at each end of the planter frame structure on the plate 64 at that end. Said bars carry a conventional marking disk 74. A brace rod 75 is provided for each marker bar connected adjacent the marking disk and to a forward location on the auxiliary frame 49. A lifting rope 76 connected to the free ends of the marker bars extends through guide eyes 77 at the top of supports 78 extending vertically from the frame structure. Said supports may be suitably braced, as illustrated in Figure 1.

In the operation of the implement as described, assuming that it is already attached to the tractor, the main frame structure as formed by the channel bars 20, the forwardly extending bars 23, the forwardly extending auxiliary frames 49, and the parts associated therewith, is secured to the drawbar against movement relative thereto by the members 22 and the brackets 24 and 26. Soil working units as supported on the beams 39 are pivoted on a transverse axis forwardly of the rear edges of the wheels, or, as previously described, forwardly of vertical, transverse planes tangent to the peripheries of the traction wheels. The particular construction of the main frame and of the auxiliary frames 49 permits this forward pivoting of the soil working units near enough to the contact lines of the wheels with the soil to form a satisfactory gauging means for the forward ends of the soil working units. This advantage puts this device in the class of implements designated as rearwardly positioned, close coupled, trailing implements. During operation of the device in the field, the ground engaging depth of the furrow openers are gauged by the shoes 45, which may be adjusted as above described. The desired resulting downward pressure may be applied to the beams 39 and 39' by applying pressure on the compression springs 59. The same rockshaft and lever means used for applying downward pressure also serve as means to lift the furrow openers out of ground engaging position.

One of the outstanding advantages of rearwardly positioned implements is the ease with which they may be detached from the tractor. The implement constituting this invention has been especially designed to facilitate attaching to and detaching from the tractor. Assuming the implement is attached, the tractor is driven to the location where the implement is to be stored. The pins 68 and 68' are then removed, allowing the standards 65 and 70 to drop vertically with the lower ends engaging the ground. As the standards are supported on the frame structure to prevent angular movement relative thereto, it is only necessary to construct the ground engaging portions with a sufficient area to prevent miring, if the implement should be positioned over soft soil. The pins 68 and 68' are then inserted in the openings 69 and 69', a slight lift being given to the implement frame, if necessary, to place the pins in the uppermost hole with the implement in its normal working position.

The pin 38' is removed, disconnecting the planter driving mechanism from the tractor wheel. The pins 25 are also removed, disconnecting the draft bars 23. The implement is, upon removal of these pins, in a condition to be detached from the tractor. It is only necessary to drive the tractor forwardly, during which movement the stub shaft portions of the members 22 are withdrawn from the plates 21. The standards 65 and 70 hold the implement in the same position which it occupied on the tractor. With the quickly detachable means 21 and 22, the above parts 38' and 25 and the supporting standards 65 and 70 form means for quickly attaching and detaching the implement to and from the tractor.

When it is desired to attach the implement to the tractor, it is very simple to back the tractor into the implement, aligned as nearly as possible in its attaching position and maneuvering the tractor until the stub shafts 22 are in line with the openings formed in the plates 21. The tractor is then moved rearwardly until the openings in the brackets 24 and 26 are in transverse alignment permitting insertion of the pins 25. The drive is then connected by inserting the pin 38'. The pins 67 and 67' are then removed from the standards 65 and 70, thereby shifting the weight of the implement onto the drawbar of the tractor. The standards are secured in raised position until needed for a support when the implement is again detached from the tractor. As illustrated and above described, the present invention is embodied in a planter in which the seed mechanism is mounted rigidly with respect to the tractor and in which the furrow opening means are pivotally secured to the frame structure of the planter. It is to be understood, however, that the features of the invention, including the quick detachable arrangement and the supporting means for the implement in detached position, may be utilized on any type of implement which is to be attached to a tractor in a close coupled position. Applicant, therefore, claims as his invention all modifications falling within the scope of the appended claims.

What is claimed is:

1. A tractor implement comprising a tractor having a rearwardly extending drawbar, an implement having a frame structure detachably secured to said drawbar against movement with respect thereto, vertically slidable standards mounted on the frame structure, means for securing said standards in lifted or in ground engaging position whereby the frame structure may be held substantially in position of attachment when disconnected from the tractor thereby facilitating subsequent attaching, and quick detachable means for aligning said drawbar and said implement upon attaching said implement whereby said means supports said implement in working position, said means comprising supporting means on said drawbar and aligning means on said implement.

2. A tractor implement comprising, in combination with a tractor, an arched rear axle structure, traction wheels mounted at the ends of said structure, a rearwardly extending U-shaped drawbar rigidly secured to the axle structure and extending rearwardly beyond the traction wheels, a transversely extending frame structure secured to the U-bar, and soil engaging units pivotally connected to said frame structure forwardly of the rear edges of the wheels, one of said units being positioned laterally beyond one of the traction wheels.

3. A tractor implement comprising, in combination with a tractor, an arched rear axle structure, traction wheels mounted at the ends of said structure, a rearwardly extending U-shaped drawbar rigidly secured to the axle structure and extending rearwardly beyond the traction wheels, a transversely extending frame structure secured to the U-bar, said structure extending laterally beyond one of the traction wheels and forwardly of the rear edge of said wheel, soil engaging units pivotally connected to said frame structure forwardly of the rear edges of the wheels, one of said units being positioned laterally beyond one of the traction wheels, seeding mechanism mounted on the frame structure, and driving means connected to the outer side of one of the wheels and to said seeding mechanism, said connection including a shaft and a pair of universal joints.

4. A tractor implement comprising, in combination with a tractor, an arched rear axle structure, traction wheels mounted at the ends of said structure, a rearwardly extending drawbar secured to the axle structure and extending rearwardly beyond the traction wheels, a transversely extending frame structure secured to the drawbar, said structure being slidably mounted in a longitudinal direction on said drawbar and removably secured thereto against said movement, and soil engaging units pivotally connected to said frame structure forwardly of the rear edges of the wheels, one of said units being positioned laterally beyond one of the traction wheels.

5. A tractor implement comprising, in combination with a tractor, an arched rear axle structure, traction wheels mounted at the ends of said structure, a rearwardly extending U-shaped drawbar rigidly secured to the axle structure and extending rearwardly beyond the traction wheels, a transversely extending frame structure secured to the U-bar, said structure being slidably mounted in a longitudinal direction on said drawbar and removably secured thereto against said movement, soil engaging units pivotally connected to said frame structure forwardly of the rear edges of the wheels, one of said units being positioned laterally beyond one of the traction wheels, seeding mechanism mounted on the frame structure, and driving means connected to the outer side of one of the wheels and to said seeding mechanism, said connection including a shaft and a pair of universal joints.

6. A tractor implement comprising, in combination with a tractor having widely spaced rear wheels and a U-shaped drawbar extending rearwardly between said wheels, a frame structure rigidly connected to the drawbar and extending transversely beyond the wheels, said frame structure including portions extending forwardly outside of the wheels, and furrow opening devices pivotally connected to the frame structure forwardly of the rear edges of the wheels, the end devices being mounted laterally beyond the wheels.

7. A tractor implement comprising, in combination with a tractor having widely spaced rear wheels and a U-shaped drawbar extending rearwardly between said wheels, a frame structure rigidly connected to the drawbar and extending transversely beyond the wheels and forwardly beyond the rear edges of said wheels at the outside thereof, and furrow opening devices pivotally connected to the frame structure forwardly of the rear edges of the wheels, the end devices being mounted beyond the wheels.

8. A tractor planter comprising, in combination with a tractor having widely spaced rear wheels and a U-shaped drawbar extending rearwardly between said wheels, a frame structure rigidly connected to the drawbar and extending transversely beyond the wheels, said frame structure including portions extending forwardly outside of the wheels, furrow opening devices pivotally connected to the frame structure forwardly of the rear edges of the wheels, the end devices being mounted laterally beyond the wheels, seed dispensing mechanisms mounted on the frame structure, means for adjusting the furrow opening devices relative to the frame structure, and supporting means mounted on the frame structure for holding said frame structure in position when detached from the tractor permitting thereby easy attachment and detachment, said supporting means including longitudinally spaced elements whereby said frame is held against tilting about a transverse axis, some of said elements being also spaced transversely, whereby said frame structure is held against tilting about a longitudinal axis.

9. A tractor planter comprising, in combination with a tractor having widely spaced rear wheels and a U-shaped drawbar extending rearwardly between said wheels, a frame structure rigidly connected to the drawbar and extending transversely beyond the wheels, said frame structure including portions extending forwardly outside of the wheels, furrow opening devices pivotally connected to the frame structure forwardly of the rear edges of the wheels, the end devices being mounted beyond the wheels, seed dispensing mechanisms mounted on the frame structure, means for adjusting the furrow opening devices relative to the frame structure, and supporting means mounted on the frame structure for holding said frame structure in position when detached from the tractor, permitting thereby easy attachment and detachment, said supporting means including longitudinally spaced elements whereby said frame is held against tilting about a transverse axis, some of said elements being also spaced transversely whereby said frame structure is held against tilting about a longitudinal axis, means for driving the seed mechanisms, said means including a shaft flexibly connected to one of the wheels at its center and flexibly connected to the seeding mechanisms.

10. A tractor implement comprising, in combination with a tractor, a rear axle structure, traction means mounted on said rear axle structure, a rearwardly extending supporting means secured to the axle structure and extending rearwardly beyond the traction means, and a transversely extending frame structure extending laterally beyond said traction means and secured to said rearwardly extending supporting means, said frame structure comprising members slidably engageable in a longitudinal direction with complemental members on said supporting means, auxiliary frames forwardly extending from said transverse frame structure and secured thereto, vertically adjustable supporting means mounted on said auxiliary frames and said transverse frame structure whereby said tractor implement when detached may be supported in such a position to facilitate subsequent attaching.

11. A tractor implement comprising, in combination with a tractor having spaced traction means and a supporting means extending rearwardly between said traction means, a frame structure rigidly connected to said supporting means and extending transversely beyond the traction means, said frame structure including portions extending forwardly outside of the traction means, ground engaging tools mounted on said forwardly extending portions, and means for pivotally mounting said tools on the aforesaid frame portions forwardly of the rear edges of said traction means.

12. A multiple planter attachment for a tractor having a rear axle structure, traction means mounted on said rear axle, and a rearwardly extending supporting means attached to said tractor, said planter attachment comprising a transversely extending frame structure, quick detachable means for supporting said transverse frame structure on said rearwardly extending supporting means, auxiliary frames forwardly extending from said transverse frame, means mounted on said transverse frame and on said auxiliary frames for supporting said planter attachment in its position of attachment when detached from the tractor, planter mechanism mounted on said transverse member, means for driving said mechanism, furrow opening means forwardly pivoted on said auxiliary frame, means mounted on said transverse member for raising and lowering said furrow opening means, draft means connecting said attachment and said tractor, and detachable drive means for driving said planter drive mechanism by the power from the tractor.

13. A multiple planter attachment for a tractor having a rear axle structure, traction means mounted on said rear axle, and a rearwardly extending supporting means attached to said tractor, said planter attachment comprising a transversely extending frame structure, quick detachable means for supporting said transverse frame structure on said supporting means, auxiliary frames forwardly extending from said transverse frame, said auxiliary frames comprising centrally positioned frame structures and laterally positioned frame structures for mounting outside of said traction means, means mounted on said transverse frame and on said laterally mounted auxiliary frames for supporting said planter attachment in its position of attachment when detached from the tractor, planter mechanism mounted on said transverse member, means for driving said mechanism, tool supporting beams forwardly and pivotally mounted on said auxiliary frame structures, furrow opening means and gauging means mounted on said beams, means for raising and lowering said beams, draft means connecting said attachment and said tractor, and detachable drive means for driving said planter drive mechanism by the power from the tractor.

14. An earth working attachment for a tractor having a rear axle structure, traction means mounted on said rear axle, and a rearwardly extending supporting means attached to said tractor, said attachment comprising a transversely extending frame structure, quick detachable means for supporting said transverse frame structure on said supporting means, auxiliary frames forwardly extending from said transverse frame, said auxiliary frames comprising centrally positioned frame structures and laterally positioned frame structures for mounting outside of said traction means, said auxiliary frames so positioned to extend forwardly of the rear edges of said traction means when said earth working attachment is attached to said supporting means, means mounted on said attachment for supporting said attachment when detached, means for securing said last mentioned supporting means in lifted or in ground engaging position whereby the earth working attachment may be held in position of attachment when detached from the tractor, tool supporting beams forwardly and pivotally mounted on said auxiliary frame structures whereby said beams will be pivoted forwardly of the rear edges of said traction means when said earth working attachment is attached to said first mentioned supporting means, means mounted on said attachment for raising and lowering said beams, earth engaging tools mounted on said beams, and draft means for connecting said attachment to said tractor.

15. A tractor implement comprising, in combination with a tractor having a rear axle structure, traction wheels mounted at the ends of said structure and a rearwardly extending draw-bar secured to the axle structure and extending rearwardly beyond the traction wheels; of a transversely extending main frame structure, a plurality of supplemental frames extending forwardly from said transversely extending main frame structure and laterally spaced from the traction wheels, means for securing said main frame structure to the draw-bar comprising cooperating supporting means on said draw-bar and frame structure adapted for relative sliding movement in a longitudinal direction with respect to each other during connection and disconnection, and means for detachably securing said main frame structure to said draw-bar against said longitudinal movement.

16. The combination with a tractor having a draft connection, of a direct connected tractor attachment unstable when detached from the tractor and wholly supported from said tractor during transport, a plurality of supporting standards on said unstable tractor attachment for use when detached from the tractor, said supporting standards comprising means for securing each standard at desired adjustment vertically relative to the tractor attachment and to each other, and complemental coupling means on said tractor draft connection and said unstable tractor attachment for securing said attachment to said tractor.

ARTHUR A. SCARLETT.